(12) United States Patent
Zou et al.

(10) Patent No.: US 8,477,454 B2
(45) Date of Patent: Jul. 2, 2013

(54) RECORDING HEAD FOR HEAT ASSISTED MAGNETIC RECORDING WITH DIFFUSION BARRIER SURROUNDING A NEAR FIELD TRANSDUCER

(71) Applicant: Seagate Technology LLC, Cupertino, CA (US)

(72) Inventors: Jie Zou, Eden Prairie, MN (US); Kaizhong Gao, Eden Prairie, MN (US); William Albert Challener, Glenville, NY (US); Mark Henry Ostrowski, Lakeville, MN (US); Venkateswara Rao Inturi, Shakopee, MN (US); Tong Zhao, Eden Prairie, MN (US); Michael Christopher Kautzky, Eagan, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 13/678,017

(22) Filed: Nov. 15, 2012

(65) Prior Publication Data

US 2013/0070576 A1 Mar. 21, 2013

Related U.S. Application Data

(63) Continuation of application No. 13/032,673, filed on Feb. 23, 2011, now Pat. No. 8,339,740.

(60) Provisional application No. 61/307,129, filed on Feb. 23, 2010.

(51) Int. Cl.
*G11B 5/02* (2006.01)

(52) U.S. Cl.
USPC .................................................. 360/125.31

(58) Field of Classification Search
USPC .................................................... 369/13.17
See application file for complete search history.

(56) References Cited

U.S. PATENT DOCUMENTS

| 7,002,228 | B2 | 2/2006 | Deak |
| 7,262,936 | B2 | 8/2007 | Hamann |
| 7,791,839 | B2 | 9/2010 | Olson |
| 8,116,034 | B2 | 2/2012 | Komura |
| 8,213,272 | B2* | 7/2012 | Takayama et al. ......... 369/13.33 |
| 8,223,597 | B2* | 7/2012 | Komura et al. ............ 369/13.33 |
| 8,284,521 | B2* | 10/2012 | Ohtsu ....................... 360/234.4 |
| 8,284,635 | B2* | 10/2012 | Matsumoto ............... 369/13.33 |
| 2005/0190496 | A1 | 9/2005 | Hamann |
| 2007/0069383 | A1 | 3/2007 | Suzuki |
| 2009/0073858 | A1 | 3/2009 | Seigler |
| 2010/0128579 | A1 | 5/2010 | Seigler |
| 2010/0214685 | A1 | 8/2010 | Seigler |
| 2010/0309581 | A1 | 12/2010 | Wu |
| 2012/0105996 | A1 | 5/2012 | Katine |
| 2012/0127839 | A1 | 5/2012 | Rawat |

* cited by examiner

*Primary Examiner* — Mark Blouin
(74) *Attorney, Agent, or Firm* — Mueting Raasch & Gebhardt PA

(57) ABSTRACT

An apparatus includes a near field transducer positioned adjacent to an air bearing surface, a first magnetic pole, a heat sink positioned between the first magnetic pole and the near field transducer, and a diffusion barrier positioned between the near field transducer and the first magnetic pole. The diffusion barrier can be positioned adjacent to the magnetic pole or the near field transducer.

20 Claims, 6 Drawing Sheets

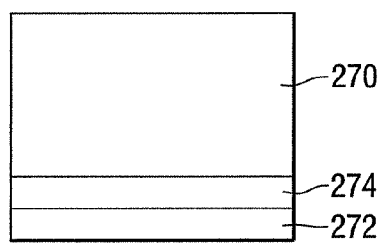
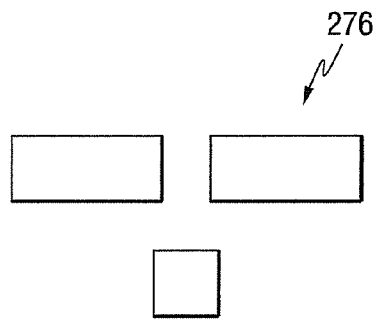
FIG. 9　　　　　　　　FIG. 10
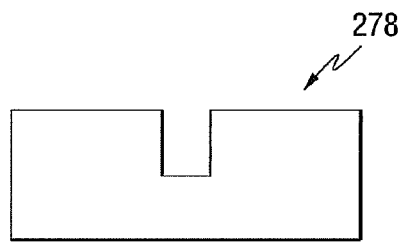
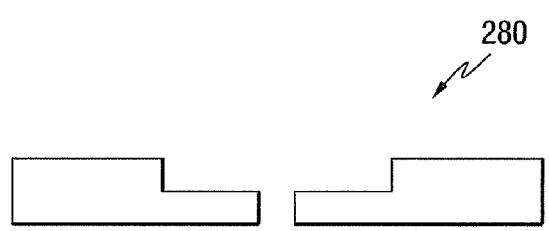
FIG. 11　　　　　　　　FIG. 12
FIG. 13

RECORDING HEAD FOR HEAT ASSISTED MAGNETIC RECORDING WITH DIFFUSION BARRIER SURROUNDING A NEAR FIELD TRANSDUCER

CROSS REFERENCE TO RELATED APPLICATION

This application is a continuation of U.S. patent application Ser. No. 13/032,673, filed Feb. 23, 2011 which claims the benefit of U.S. Provisional Patent Application No. 61/307,129, filed Feb. 23, 2010, and titled "Diffusion Barrier For HAMR Head Between NFT And Writer (Recording Head For Heat Assisted Magnetic Recording)", which is hereby incorporated by reference.

BACKGROUND

In heat assisted magnetic recording, information bits are recorded on a data storage medium at elevated temperatures, and the data bit dimension can be determined by the dimensions of the heated area in the storage medium or the dimensions of an area of the storage medium that is subjected to a magnetic field. In one approach, a beam of light is condensed to a small optical spot onto the storage medium to heat a portion of the medium and reduce the magnetic coercivity of the heated portion. Data is then written to the reduced coercivity region.

Current HAMR recording head designs generally have a near field transducer (NFT) that is capable of focusing light to a spot size smaller than the diffraction limit. The NFT is designed to reach local surface-plasmon at a designed light wavelength. At resonance, a high electric field surrounding the NFT appears, due to the collective oscillation of electrons in the metal. A portion of the field will tunnel into the storage medium and get absorbed, raising the temperature of the medium locally for recording.

The NFT's temperature significantly increases at plasmonic resonance. To help dissipate the heat, a heat sink can be added to the NFT that connects to the write pole. This significantly reduces the temperature of NFT. The heat sink may be made of the same plasmonic material as the NFT itself, such as Au, Ag or Cu.

SUMMARY

In a first aspect, the disclosure provides an apparatus including a near field transducer positioned adjacent to an air bearing surface, a first magnetic pole, a heat sink positioned between the first magnetic pole and the near field transducer, and a diffusion barrier positioned between the near field transducer and the first magnetic pole.

In another aspect, the disclosure provides an apparatus including a near field transducer positioned adjacent to an air bearing surface, a first magnetic pole, and a heat sink positioned between the first magnetic pole and the near field transducer, wherein heat sink provides a diffusion barrier between the near field transducer and the first magnetic pole.

These and other features and advantages which characterize the various embodiments of the present disclosure can be understood in view of the following detailed discussion and the accompanying drawings.

BRIEF DESCRIPTION OF THE DRAWINGS

FIG. 9 is a plan view of a portion of an air bearing surface of a recording head.

FIGS. 10-13 are schematic representations of near field transducers.

DETAILED DESCRIPTION OF THE INVENTION

Figure 1:
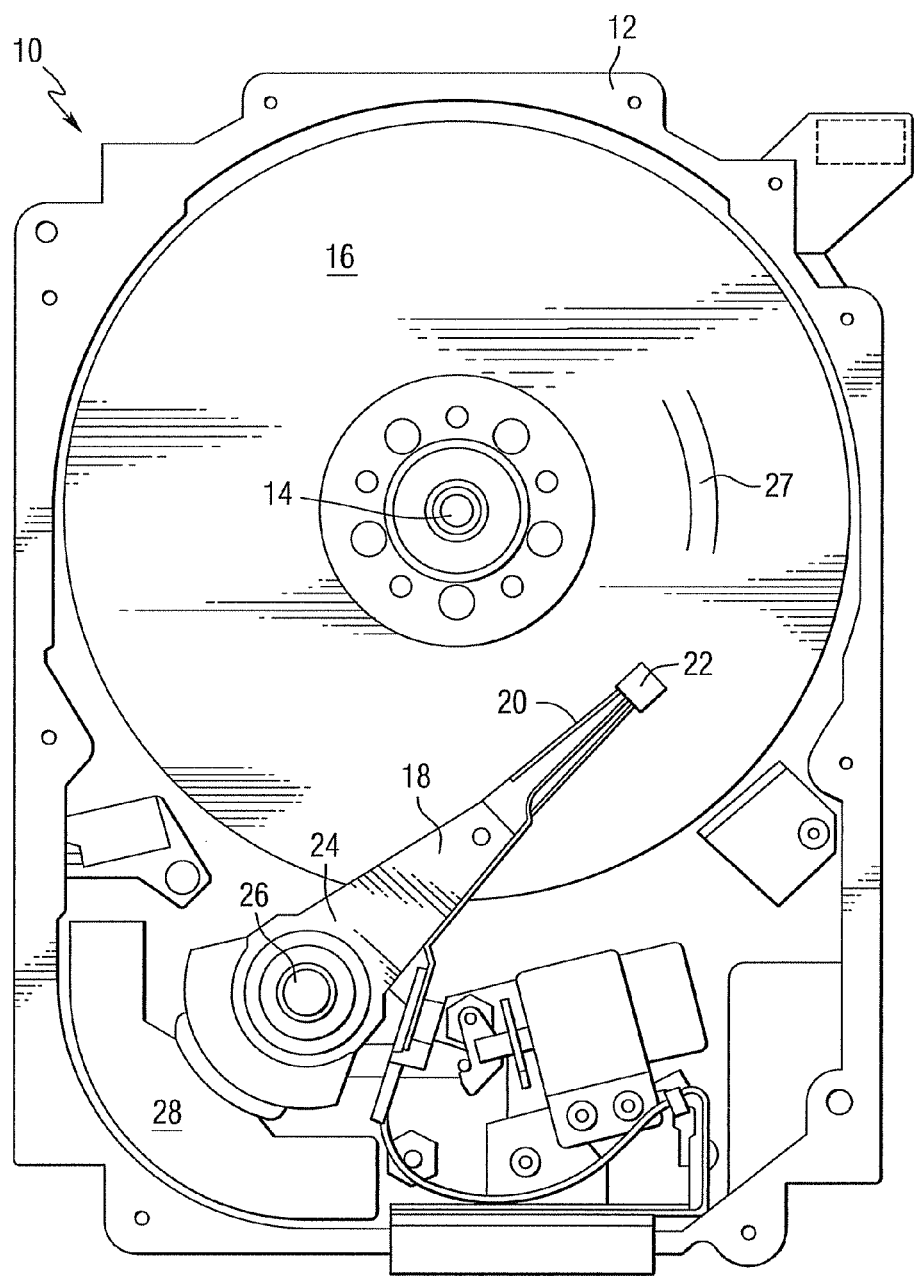
FIG. 1 is a pictorial representation of a data storage device in the form of a disc drive that can include a recording head constructed in accordance with an aspect of this disclosure.

FIG. 1 is a pictorial representation of a data storage device in the form of a disc drive 10 that can utilize recording heads constructed in accordance with various aspects of the disclosure. The disc drive 10 includes a housing 12 (with the upper portion removed and the lower portion visible in this view) sized and configured to contain the various components of the disc drive. The disc drive 10 includes a spindle motor 14 for rotating at least one magnetic storage media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the data storage media to raise the temperature of a localized area of the media to facilitate switching of the magnetization of the area. Recent designs of HAMR recording heads include a thin film waveguide on a slider to guide light to the storage media for localized heating of the storage media. While FIG. 1 shows a disc drive, the invention can be applied to other devices that include a transducer and a storage media, wherein the storage media is heated to facilitate switching of bits in the storage media.

Figure 2:
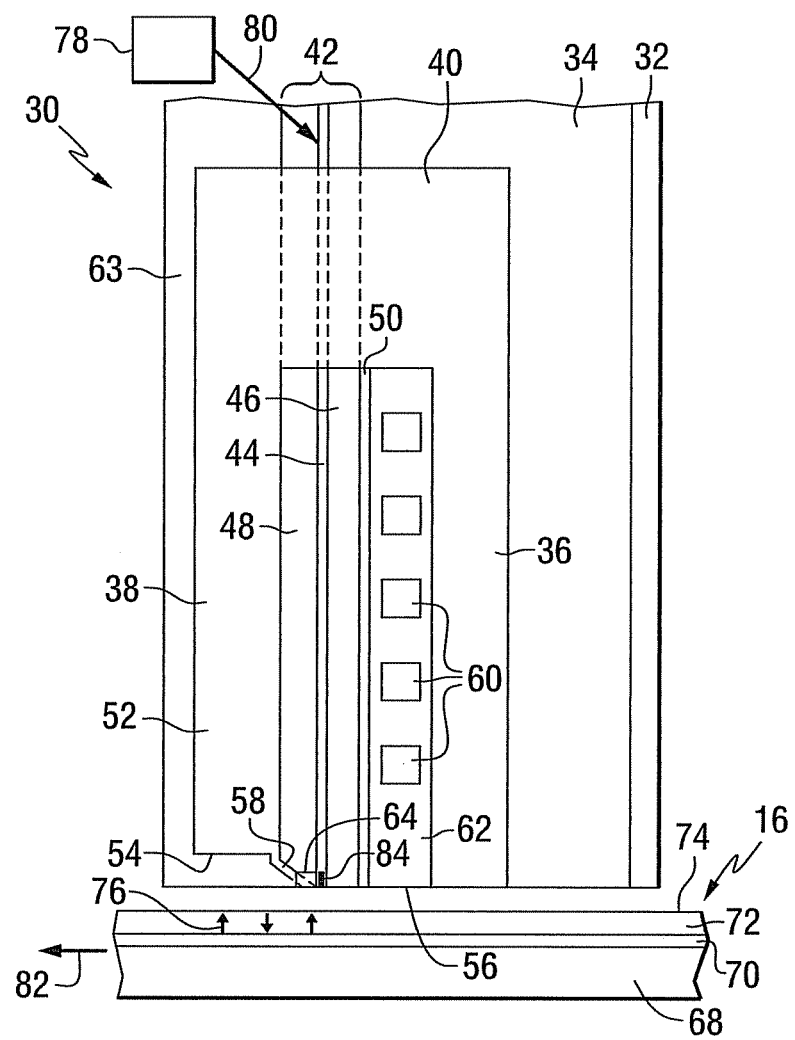
FIG. 2 is a side elevation view of a recording head constructed in accordance with an aspect of the disclosure.

FIG. 2 is a side elevation view of a recording head constructed in accordance with an aspect of the disclosure, and positioned near a storage media. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. In this example, the top pole serves as a write pole and the bottom pole serves as a return pole.

An insulating material 62 separates the coil turns. In one example, the substrate can be AlTiC, the core layer can be $Ta_2O_5$, and the cladding layers (and other insulating layers) can be $Al_2O_3$. A top layer of insulating material 63 can be formed on the top pole. A heat sink 64 is positioned adjacent to the sloped pole piece 58. The heat sink can be comprised of a non-magnetic material such as, for example, Au.

As illustrated in FIG. 2, the recording head 30 includes a structure for heating the magnetic storage media 16 proximate to where the write pole 58 applies the magnetic write field H to the storage media 16. The media 16 includes a substrate 68, a heat sink layer 70, a magnetic recording layer 72, and a protective layer 74. A magnetic field H produced by current in the coil 60 is used to control the direction of magnetization of bits 76 in the recording layer of the media.

The storage media 16 is positioned adjacent to or under the recording head 30. The waveguide 42 conducts light from a source 78 of electromagnetic radiation, which may be, for example, ultraviolet, infrared, or visible light. The source may be, for example, a laser diode, or other suitable laser light source for directing a light beam 80 toward the waveguide 42. Various techniques that are known for coupling the light beam 80 into the waveguide 42 may be used. Once the light beam 80 is coupled into the waveguide 42, the light propagates through the waveguide 42 toward a truncated end of the waveguide 42 that is formed adjacent the air bearing surface (ABS) of the recording head 30. Light exits the end of the waveguide and heats a portion of the media, as the media moves relative to the recording head as shown by arrow 82. A near field transducer (NFT) 84 is positioned in or adjacent to the waveguide and at or near the air bearing surface. The heat sink material may be chosen such that it does not interfere with the resonance of the NFT. In various embodiments, the near field transducer can take the form of an antenna. FIGS. 10, 11, 13 and 14 show the shapes of several different embodiments of the NFT 276, 278, 280 and 282 as viewed from the air bearing surface.

Although the example of FIG. 2 shows a perpendicular magnetic recording head and a perpendicular magnetic storage media, it will be appreciated that the disclosure may also be used in conjunction with other types of recording heads and/or storage media where it may be desirable to concentrate light to a small spot.

Elements in structures surrounding the NFT, such as the magnetic write pole and dielectric layers, can diffuse into the NFT through the NFT heat sink during operation when the NFT is at elevated temperatures. This can potentially degrade the optic properties of the plasmonic materials in the NFT and reduce the coupling efficiency. Furthermore, plasmonic materials in the NFT can also diffuse into the surrounding structures such as magnetic write pole and dielectric layers, degrading the magnetic properties of the write pole and the optical properties of the dielectric layers.

In one aspect, the disclosure provides a HAMR NFT design with improved reliability. A diffusion barrier is included to limit the diffusion of pole materials into the NFT. This design also lowers the NFT temperature.

Figure 3:
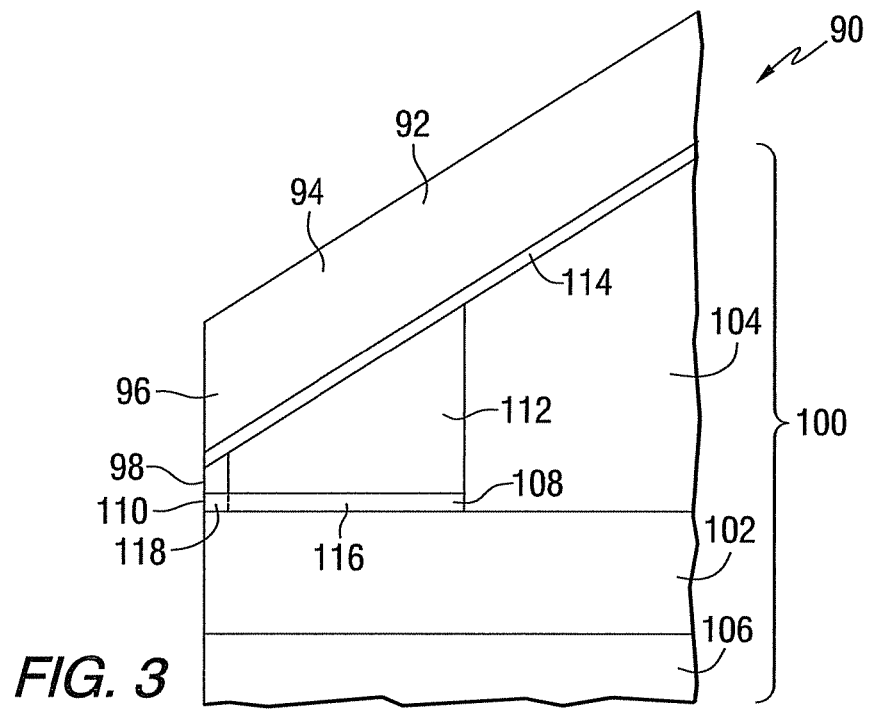
FIG. 3 is a cross-sectional view of a portion of a recording head constructed in accordance with an aspect of the disclosure.

In one embodiment, a diffusion barrier is positioned between the pole and NFT. This embodiment is illustrated in FIG. 3, which is an enlarged view of a portion of a magnetic recording head 90. The recording head includes a magnetic pole 92 that can be made of CoFe, and includes a sloped portion 94 having an end 96 positioned adjacent to an air bearing surface 98. The head further includes a waveguide 100 having a core layer 102 sandwiched between first and second cladding layers 104 and 106. A near field transducer 108 is positioned adjacent to the core layer and has an end 110 positioned adjacent to the air bearing surface. A heat sink 112 is positioned between the NFT and the pole. A diffusion barrier layer 114 is positioned between the magnetic pole and the heat sink. The diffusion barrier limits the diffusion of pole materials into the NFT. The diffusion barrier also doubles as a seed layer for the plating of the CoFe pole. The NFT can be a lollipop design having a disk portion 116 and a peg 118 that extends from the disk portion to the air bearing surface. The heat sink is positioned between the disk portion and the magnetic pole.

Figure 4:
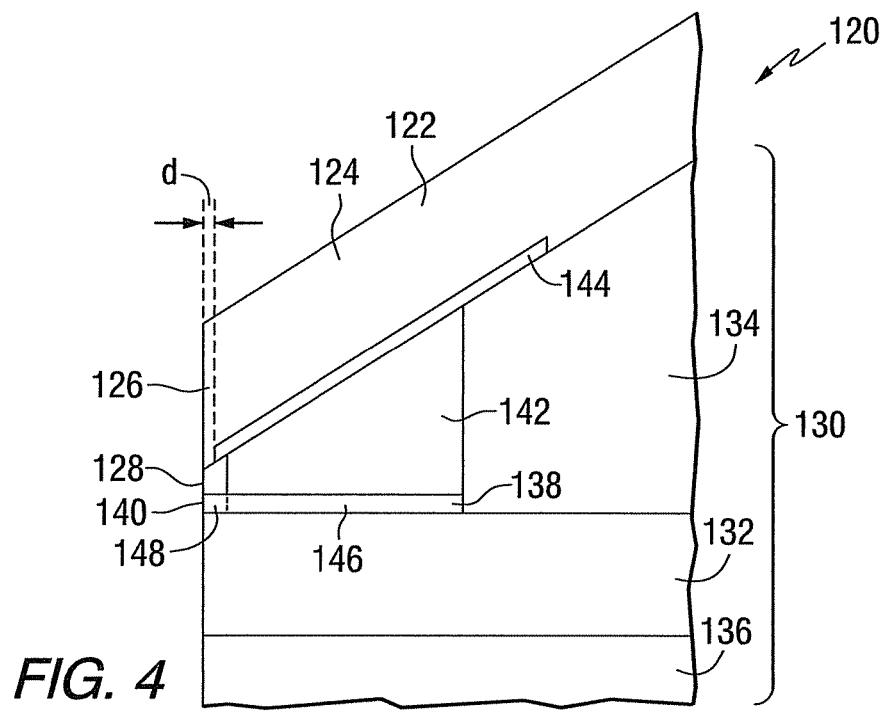
FIG. 4 is a cross-sectional view of a portion of a recording head constructed in accordance with another aspect of the disclosure.

FIG. 4 is a cross-sectional view of a portion of another recording head 120 constructed in accordance with another aspect of the disclosure. The recording head includes a magnetic pole 122 that can be made of CoFe, and includes a sloped portion 124 having an end 126 positioned adjacent to an air bearing surface 128. The head further includes a waveguide 130 having a core layer 132 sandwiched between first and second cladding layers 134 and 136. A near field transducer 138 is positioned adjacent to the core layer and has an end 140 positioned adjacent to the air bearing surface. A heat sink 142 is positioned between the NFT and the pole. A diffusion barrier layer 144 is positioned between the magnetic pole and the heat sink. The diffusion barrier limits the diffusion of pole materials into the NFT. The NFT can be a lollipop design having a disk portion 146 and a peg 148 that extends from the disk portion to the air bearing surface. The heat sink is positioned between the disk portion and the magnetic pole. In this example, the diffusion barrier layer does not extend to the air bearing surface, but rather is spaced from the air bearing surface by a distance d.

In the design of FIG. 3, the addition of the diffusion barrier 114 increases the NFT-to-pole spacing (NPS). Since a small NPS may be desirable for HAMR recording, the designs of FIG. 3 may impose a limitation on the diffusion barrier thickness. The embodiment of FIG. 4 removes this limitation. In FIG. 4, the diffusion barrier is patterned to be recessed from ABS. Thus, the NPS does not include the diffusion barrier in the region near the air bearing surface and the NPS can be reduced.

Figure 5:
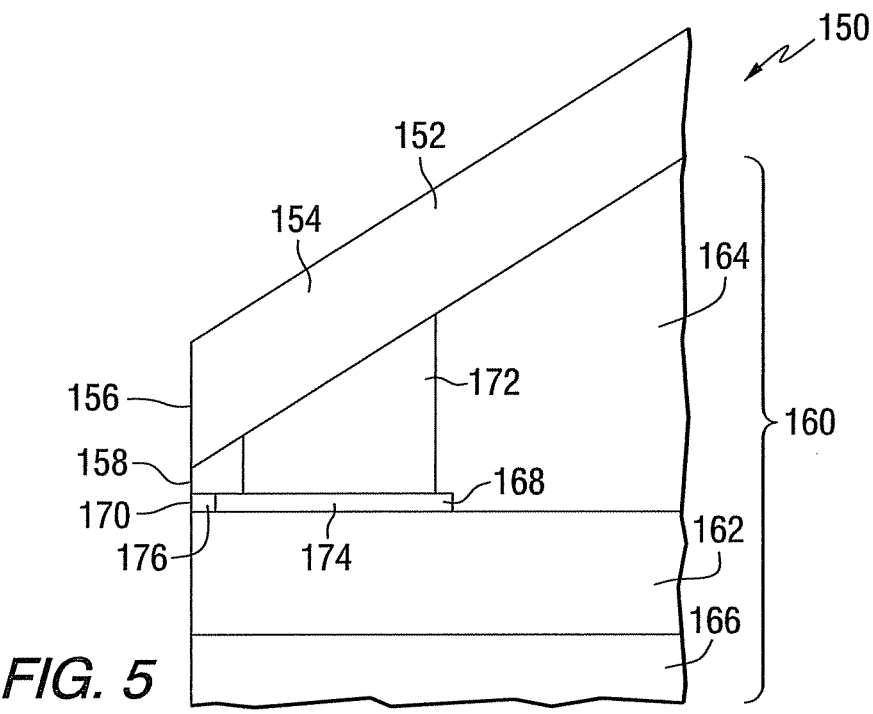
FIG. 5 is a cross-sectional view of a portion of another recording head constructed in accordance with another aspect of the disclosure.

FIG. 5 is a cross-sectional view of a portion of another recording head 150 constructed in accordance with an aspect of the disclosure. The recording head includes a magnetic pole 152 that can be made of CoFe, and includes a sloped portion 154 having an end 156 positioned adjacent to an air bearing surface 158. The head further includes a waveguide 160 having a core layer 162 sandwiched between first and second cladding layers 164 and 166. A near field transducer 168 is positioned adjacent to the core layer and has an end 170 positioned adjacent to the air bearing surface. A heat sink 172 is positioned between the NFT and the pole. In this example, the heat sink is made of a material that also serves as a diffusion barrier. The diffusion barrier limits the diffusion of pole materials into the NFT. The NFT can be a lollipop design having a disk portion 174 and a peg 176 that extends from the disk portion to the air bearing surface. The heat sink is positioned between the disk portion and the magnetic pole.

In the FIG. 5 embodiment, the heat sink uses the diffusion barrier material, instead of the same plasmonic material as the NFT. The heat sink acts as the diffusion barrier between the write pole and the NFT, as well as a heat sink. Example materials and material properties are described below.

Figure 6:
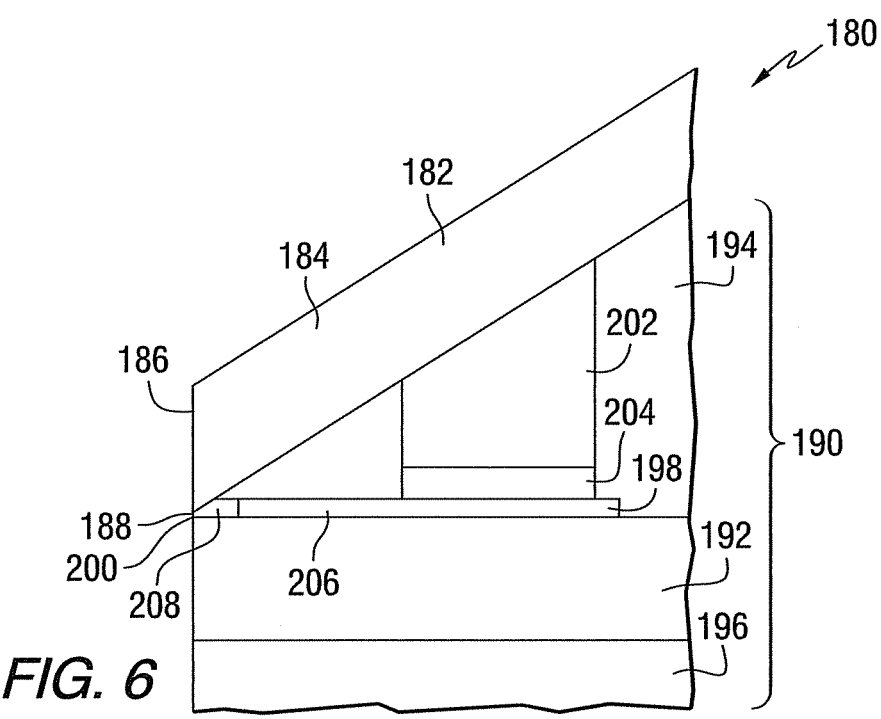
FIG. 6 is a cross-sectional view of another recording head constructed in accordance with another aspect of the disclosure.

FIG. 6 is a cross-sectional view of another recording head 180 constructed in accordance with an aspect of the disclosure. The recording head includes a magnetic pole 182 that can be made of CoFe, and includes a sloped portion 184 having an end 186 positioned adjacent to an air bearing surface 188. The head further includes a waveguide 190 having a core layer 192 sandwiched between first and second cladding layers 194 and 196. A near field transducer 198 is positioned adjacent to the core layer and has an end 200 positioned adjacent to the air bearing surface. A heat sink 202 is positioned between the NFT and the pole. A diffusion barrier layer 204 is positioned between the NFT and the heat sink. The diffusion barrier limits the diffusion of pole materials into the NFT. The NFT can be a lollipop design having a disk portion 206 and a peg 208 that extends from the disk portion to the air bearing surface. The diffusion barrier layer is positioned between the disk portion and the heat sink. In the embodiment of FIG. 6, the heat sink has a bi-layer structure, where the bottom part is the diffusion barrier while the upper part still uses Au. For a similar bi-layer structure, the material order can be reversed, where the bottom part is the plasmonic material such as Au and the upper part is the diffusion barrier material. Such a bi-layer structure can also be repeated to form multi-layer structure.

Figure 7:
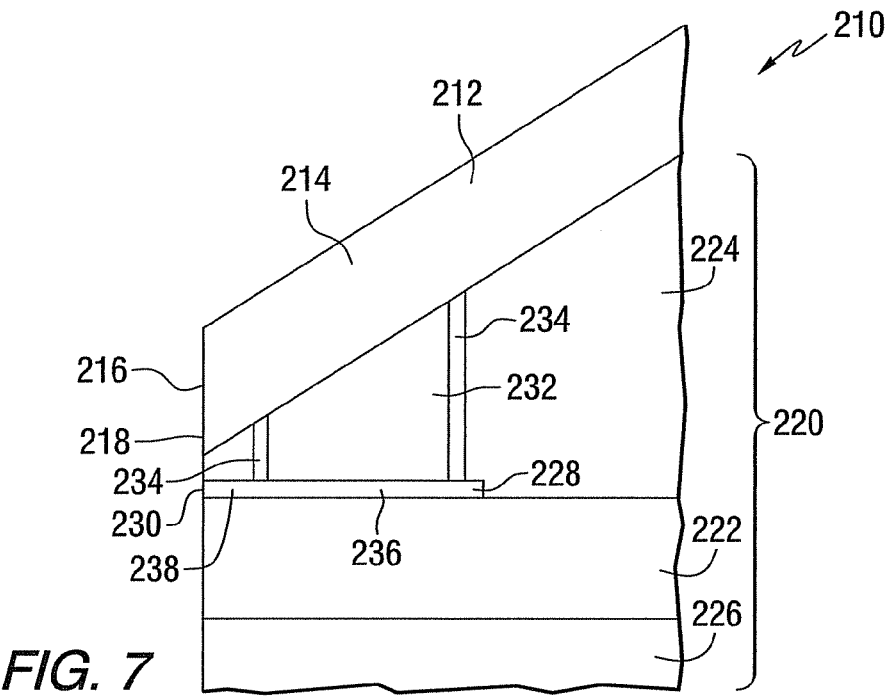
FIG. 7 is a cross-sectional view of another recording head constructed in accordance with another aspect of the disclosure.

FIG. 7 is a cross-sectional view of another multilayer recording head 210 constructed in accordance with an aspect of the disclosure. The recording head includes a magnetic pole 212 that can be made of CoFe, and includes a sloped portion 214 having an end 216 positioned adjacent to an air bearing surface 218. The head further includes a waveguide 220 having a core layer 222 sandwiched between first and second cladding layers 224 and 226. A near field transducer 228 is positioned adjacent to the core layer and has an end 230 positioned adjacent to the air bearing surface. A heat sink 232 is positioned between the NFT and the pole. A diffusion barrier layer 234 is positioned around the heat sink. The diffusion barrier limits the diffusion of waveguide cladding materials into the NFT. The NFT can be a lollipop design having a disk portion 236 and a peg 238 that extends from the disk portion to the air bearing surface. In the embodiment of FIG. 7, a diffusion barrier shell is positioned outside the NFT heat sink, to provide protection against potential diffusion or reaction between the NFT heat sink and surrounding clad layer. One additional benefit of this embodiment is the potential enhanced adhesion between the heat sink and clad layers.

Figure 8:
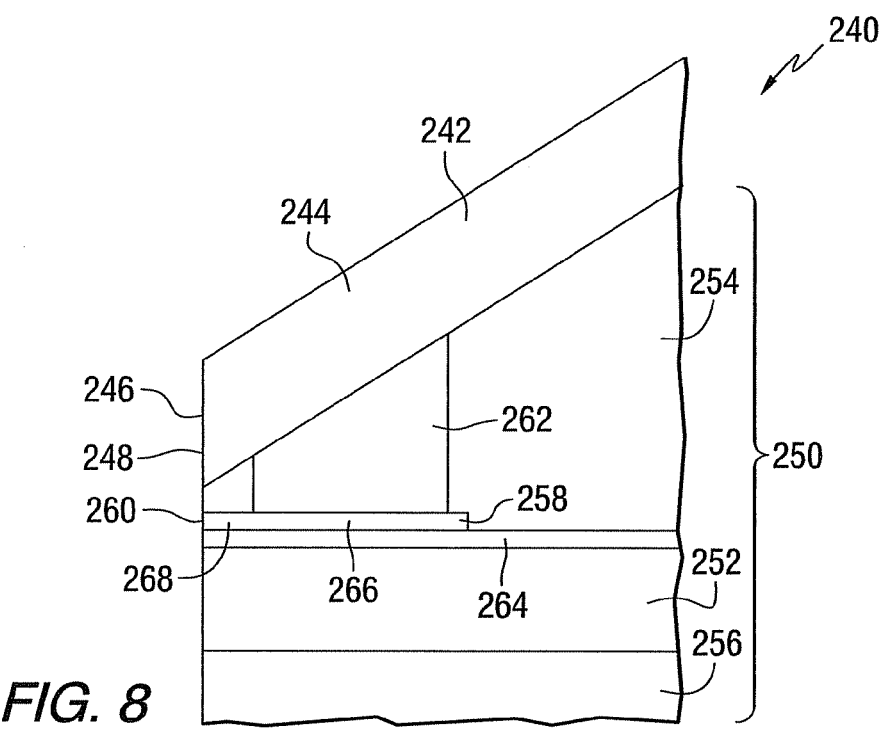
FIG. 8 is a cross-sectional view of another recording head constructed in accordance with another aspect of the disclosure.

FIG. 8 is a cross-sectional view of another recording head 240 constructed in accordance with an aspect of the disclosure. The recording head includes a magnetic pole 242 that can be made of CoFe, and includes a sloped portion 244 having an end 246 positioned adjacent to an air bearing surface 248. The head further includes a waveguide 250 having a core layer 252 sandwiched between first and second cladding layers 254 and 256. A near field transducer 258 is positioned adjacent to the core layer and has an end 260 positioned adjacent to the air bearing surface. A heat sink 262 is positioned between the NFT and the pole. A diffusion barrier layer 264 is positioned between the NFT and the core layer. The diffusion barrier limits the diffusion of core layer material into the NFT. The NFT can be a lollipop design having a disk portion 266 and a peg 268 that extends from the disk portion to the air bearing surface. In the embodiment of FIG. 8, a diffusion barrier is added under the NFT, to provide protection against diffusion between the plasmonic material of the NFT and the core or cladding layer under the NFT. One additional benefit of this embodiment is the potential enhanced adhesion of the NFT on the core or cladding layer underneath.

Other embodiments can include various combinations of the features of the embodiments of FIGS. 3-8.

The disclosure is not limited to the embodiments of FIGS. 3-8. For a more generalized case, the HAMR head basic structure will include: a transducer with a plasmonic metallic layer, a metallic layer and a ferromagnetic metallic layer, where the center layer is preferred to be a non-magnetic, non-plasmonic layer. FIG. 9 is an air bearing surface view of a magnetic pole 270 separated from a plasmonic material NFT 272 by a non-magnetic, non-plasmonic material 274.

While certain materials are set forth above in the described embodiments, it should be understood that other materials can be used in place of the materials described in the particular embodiments. The specific materials used can be chosen in accordance with the following criteria. In one embodiment, the diffusion percentage between the plasmonic material and the non-magnetic, non-plasmonic layer may be less than 2% at 400° C. and the diffusion percentage between the non-magnetic, non-plasmonic layer and the NFT may be less than 2% at 400° C. Materials for the diffusion barrier should have very low solubility in the plasmonic NFT materials. Furthermore, the materials should have good thermal conductivity, so that heat can be efficiently dissipated. A variety of materials can be used as diffusion barrier materials when Au is the NFT material, for example, Rh and its alloys; Ru and its alloys; Ti, and its alloys including but not limited to TiC, TiN, TiCN, TiPd, Ti$_3$Pd; Ta, and its alloys including but not limited to TaC, TaN, TaCN; W and its alloys including but not limited to WN, WCN, WTi, WTiN; borides including but not limited to ZrB$_2$, TiB$_2$, HfB$_2$, MgB$_2$, and VB$_2$; nitrides including but not limited to TaN, TiN; and transition metal oxides, can be used as diffusion barrier materials when Au is the NFT material. Since magnetic materials generally have relatively poor thermal conductivity, the addition of a better thermally conductive diffusion barrier may dissipate heat better and lower the NFT temperature. This may further improve the NFT reliability. The plasmonic NFT can be selected from Au, Ag, Cu or alloys thereof. The non-magnetic, non-plasmonic layer can be a laminated structure. The non-, non-plasmonic layer can be wrapped around of magnetic pole material. The magnetic material can be for example, Co, Fe, and Ni, or alloys containing Co, Fe and/or Ni.

While the invention has been described in terms of several examples, it will be apparent to those skilled in the art that various changes can be made to the disclosed examples, without departing from the scope of the invention as set forth in the following claims. The implementations described above and other implementations are within the scope of the following claims.

What is claimed is:

1. An apparatus comprising:
    a near field transducer positioned adjacent to an air bearing surface;
    a first magnetic pole; and
    a heat sink positioned between the first magnetic pole and the near field transducer, wherein the heat sink comprises one of Rh, Ru, Ti, Ta, W; an alloy of Rh, Ru, Ti, Ta or W; a boride; a nitride; or a transition metal oxide.

2. The apparatus according to claim 1, wherein the heat sink provides a diffusion barrier between the near field transducer and the first magnetic pole.

3. The apparatus according to claim 1, wherein the heat sink comprises Rh, W, or TiN.

4. The apparatus according to claim 1, wherein the first magnetic pole comprises one of: Co, Fe, Ni, or alloys containing Co, Fe, and/or Ni.

5. The apparatus according to claim 1, wherein the near field transducer comprises an antenna.

6. The apparatus according to claim 1, wherein the heat sink has a bilayer structure.

7. The apparatus according to claim 6, wherein a portion of the heat sink in contact with the NFT acts as a diffusion barrier.

8. An apparatus comprising:
a near field transducer positioned adjacent to an air bearing surface of the apparatus;
a first magnetic pole;
a heat sink positioned between the first magnetic pole and the near field transducer; and
a diffusion barrier positioned between the near field transducer and the heat sink.

9. The apparatus according to claim 8, wherein the near field transducer comprises a disk and a peg, wherein the peg extends from the disk portion to the air bearing surface of the apparatus.

10. The apparatus according to claim 9, wherein the diffusion barrier is positioned between the disk portion of the NFT and the heat sink.

11. The apparatus according to claim 10, wherein the diffusion barrier comprises one of Rh, Ru, Ti, Ta, W; an alloy of Rh, Ru, Ti, Ta or W; a boride; a nitride; or a transition metal oxide.

12. An apparatus comprising:
a near field transducer positioned adjacent to an air bearing surface, the near field transducer comprising gold, silver, copper or alloys of gold, silver, or copper;
a first magnetic pole;
a heat sink positioned between the first magnetic pole and the near field transducer; and
a diffusion barrier positioned between the near field transducer and the first magnetic pole, the diffusion barrier comprising Rh, Ru, Ti, Ta, W; an alloy of Rh, Ru, Ti, Ta or W; a boride, a nitride; or a transition metal oxide.

13. The apparatus according to claim 12, wherein the near field transducer comprises an antenna.

14. The apparatus according to claim 12, wherein the diffusion barrier is spaced from the air bearing surface.

15. The apparatus according to 12, wherein the diffusion barrier comprises a multilayer structure.

16. The apparatus according to claim 12 further comprising: a waveguide having a core layer, wherein the diffusion barrier is positioned between the near field transducer and the core layer of the waveguide.

17. The apparatus according to claim 12, wherein the diffusion barrier comprises Rh, W, or TiN.

18. The apparatus according to claim 12, wherein the diffusion barrier comprises a nitride.

19. The apparatus according to claim 12, wherein the near field transducer comprises a disk and a peg, wherein the peg extends from the disk portion to the air bearing surface of the apparatus.

20. The apparatus according to claim 12, wherein the first magnetic pole comprises one of: Co, Fe, Ni, or alloys containing Co, Fe and/or Ni.

* * * * *